(12) United States Patent
Parris

(10) Patent No.: US 8,328,645 B2
(45) Date of Patent: Dec. 11, 2012

(54) COAXIAL DRIVE CABLE CENTERING DEVICE

(75) Inventor: Guerry T Parris, Cedartown, GA (US)

(73) Assignee: Suhner Manufacturing, Inc., Rome, GA (US)

( * ) Notice: Subject to any disclaimer, the term of this patent is extended or adjusted under 35 U.S.C. 154(b) by 303 days.

(21) Appl. No.: 12/690,175

(22) Filed: Jan. 20, 2010

(65) Prior Publication Data

US 2011/0176759 A1     Jul. 21, 2011

(51) Int. Cl.
*F16C 1/06* (2006.01)
(52) U.S. Cl. .......................................... 464/52; 384/218
(58) Field of Classification Search ............... 464/52, 464/53, 170, 174; 74/500.5, 502.4, 502.5, 74/502.6; 384/215, 218
See application file for complete search history.

(56) References Cited

U.S. PATENT DOCUMENTS

| | | | | |
|---|---|---|---|---|
| 1,481,078 A | * | 1/1924 | Albertson | 464/52 |
| 2,090,174 A | * | 8/1937 | Albright | 464/53 X |
| 2,915,089 A | * | 12/1959 | Horsting, Sr. | 464/174 X |
| 3,180,625 A | * | 4/1965 | Wyzenbeek | 464/174 X |
| 4,126,928 A | | 11/1978 | Hoff | |
| 4,226,021 A | | 10/1980 | Hoff | |
| 4,848,846 A | * | 7/1989 | Yamada et al. | |
| 5,364,307 A | | 11/1994 | Shaulis | |
| 5,599,233 A | | 2/1997 | Shaulis | |
| 5,695,404 A | | 12/1997 | Shaulis | |
| 5,931,736 A | | 8/1999 | Schere et al. | |
| 6,010,407 A | * | 1/2000 | Ishikawa | 464/52 |
| 6,913,539 B1 | * | 7/2005 | Scherer | 464/52 X |
| 2003/0199327 A1 | * | 10/2003 | Sasaki et al. | 464/170 |
| 2010/0192386 A1 | * | 8/2010 | Hause et al. | 464/170 X |

\* cited by examiner

*Primary Examiner* — Gregory Binda
*Assistant Examiner* — Matthieu Setliff
(74) *Attorney, Agent, or Firm* — Baker Donelson; Dorian B. Kennedy

(57) ABSTRACT

A working tool (10) includes a gasoline motor (11), a working head (12), and a shaft assembly (14) extending between and mechanically coupling the engine and the working head. The shaft assembly includes a frame tube (18), a flexible drive cable (19), and an elongated coaxial drive cable centering device or support member (20) positioned between the drive cable and the frame tube. The support member includes a sheath (21) and a plurality of centering members (22). The centering members includes contacting elements (23) in the form of spiral or a flexible rubber bushings having a central tube (34) and a plurality of spaced annular rings or flanges (35).

6 Claims, 2 Drawing Sheets

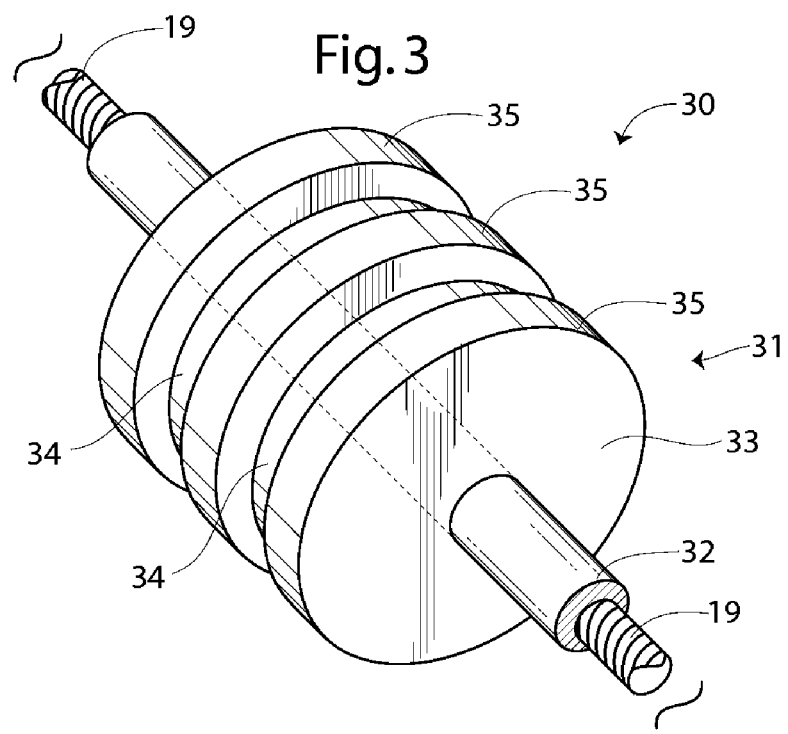
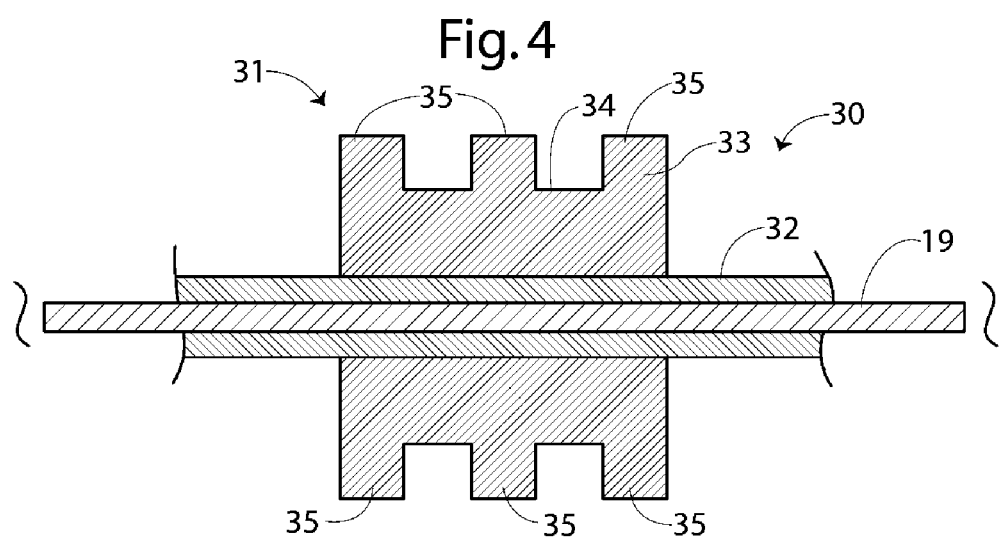

ns as a cutting apparatus or lawn trimmer, in a preferred form of the invention. The lawn trimmer 10 has a gasoline motor or engine 11 power head and a working head in the form of a rotating lawn cutting tool 12, although any commonly available power head and working head may be utilized as an alternative. A shaft assembly 14 extends between and mechanically couples the engine 11 and the cutting tool 12, so that operation of the engine causes the actuation of the cutting portion of the cutting tool. The shaft assembly 14 is fitted with handles 15 to enable it to be easily carried and manipulated. A throttle 16 is coupled to a handle 15 to control the speed of the engine 11.

COAXIAL DRIVE CABLE CENTERING DEVICE

TECHNICAL FIELD

This invention relates to devices for the centering of a coaxial drive cable, and specifically the devices for centering a coaxial drive cable within a cylindrical housing.

BACKGROUND OF THE INVENTION

Many working implements, such as lawn trimmers, utilize a small motor coupled to a working head through a rotating drive cable. These rotating drive cables are inadequate to support the weight and torque of the working head. As such, the drive cable is positioned concentrically or coaxially within a larger diameter casing or frame tube. However, if an excessive amount of torque is applied to the drive cable, the cable may buckle or twist within the frame tube. Furthermore, with a high rotational speed, the drive cable may chatter within the frame tube, causing a noise problem and creating excessive friction which may harm the drive cable.

To lessen the problems associated with the mounting of a rotating cable within a housing periodic spacers have been developed. These spacers are typically in the form of an intermediate support member or coaxial drive cable centering apparatus. The support member includes a central tube or sheath in which the cable is positioned and an annular array of fins extending radially out from the central sheath. The fins provide a snug fit between the sheath and the outer frame tube. These fins however do not always provide a smooth transition when the frame tube is curved, as with lawn trimmers and the like, again resulting in the creation of excessive heat and noise.

Accordingly, it is seen that a need exists for a coaxial drive cable centering device or support member which may better position a drive cable within an outer frame tube. It thus is to the provision of such that the present invention is primarily directed.

SUMMARY OF THE PRESENT INVENTION

In a preferred form of the invention, in combination with a working implement having a power head, a working head and a shaft assembly which extends between the power head and the working head which includes a frame tube, a drive cable, and a coaxial drive cable centering device. The drive cable centering device has a flexible central sheath and a plurality of centering members. Each centering member has a plurality of annular contacting elements positioned between the sheath and the frame tube.

BRIEF DESCRIPTION OF THE DRAWINGS

FIG. 3 is a perspective view of a portion of a shaft assembly in another preferred form of the invention.

FIG. 4 is a cross-sectional view of a portion of a shaft assembly of FIG. 3.

DETAILED DESCRIPTION

Figure 1:
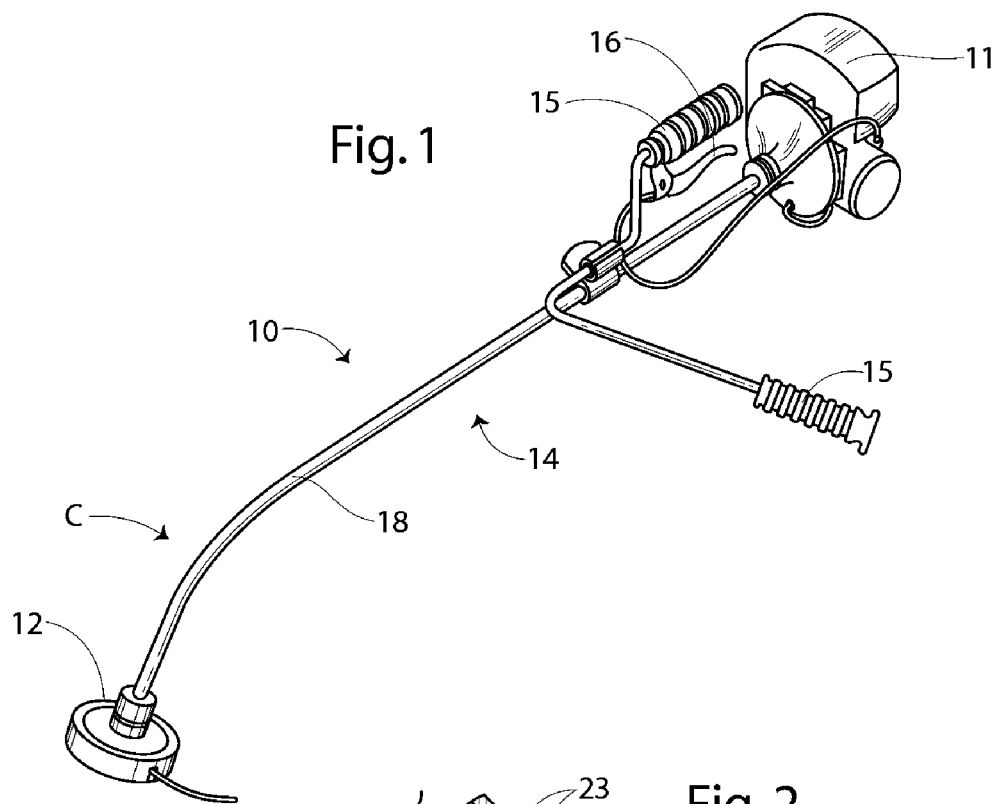
FIG. 1 is a perspective view of a lawn trimmer having a shaft assembly in a preferred form of the invention.
Figure 2:
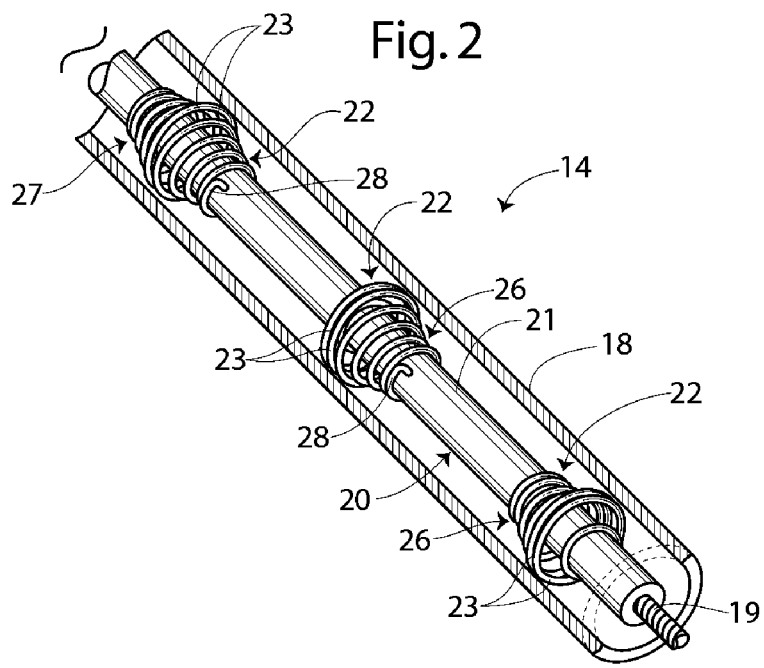
FIG. 2 is a perspective view of a portion of the shaft assembly of FIG. 1, shown in partial cross-section.

With reference next to the drawings, there is shown a working tool or implement 10, shown and referred to herein as a cutting apparatus or lawn trimmer, in a preferred form of the invention. The lawn trimmer 10 has a gasoline motor or engine 11 power head and a working head in the form of a rotating lawn cutting tool 12, although any commonly available power head and working head may be utilized as an alternative. A shaft assembly 14 extends between and mechanically couples the engine 11 and the cutting tool 12, so that operation of the engine causes the actuation of the cutting portion of the cutting tool. The shaft assembly 14 is fitted with handles 15 to enable it to be easily carried and manipulated. A throttle 16 is coupled to a handle 15 to control the speed of the engine 11.

The shaft assembly 14 includes a conventional elongated, metal, outer casing or frame tube 18, a conventional elongated, rotating, flexible drive cable 19, and an elongated coaxial drive cable centering device or support member 20 positioned between the drive cable 19 and the frame tube 18. The support member 20 includes an elongated, flexible, central tube or sheath 21 and a plurality of longitudinally aligned, elongated, spirally wound centering members, coils, or springs 22 which may be repositionable along the sheath. Each individual spiral or loop of the centering member 22, especially the larger spirals, may be considered an annular contacting element 23 of a plurality of longitudinally arranged, annular contacting element 23, even though each "loop" of the spiral or coil does not lie in a plane. The sheath 21 of the support member may be made of a nylon material.

Each centering member 22 may be in the form of a single helix or cone member 26 or a double helix or cone member 27. As used herein, the term single helix or cone member is intended to describe a spiral winding that commences with a diameter generally equal to the exterior diameter of the sheath 21 and which gradually increases in diameter to generally that of the interior diameter of the frame tube 14 before abruptly decreasing in diameter to that of the sheath exterior so as to be snugly mounted upon the sheath (cone shaped). A double helix or cone member is intended to describe a spiral winding that gradually increases in diameter from that of the sheath exterior to that of the interior diameter of the frame tube 14 before gradually decreasing in diameter back to that of the sheath diameter (double cone or barrel shaped). Each centering member 22 has its tag ends 28 turned inwardly so as to be partially embedded within the sheath 21 to prevent rotation of the centering member 22 relative to the sheath 21 once the centering member is placed in its proper position along the sheath.

In use, the coaxial cable centering device 20 is mounted within the frame tube 18 so that the centering members 22 provides a concentric relationship between the sheath 21 and the frame tube 18. This is especially important when, as shown in FIG. 1, the frame tube 18 is curved C in order to direct or otherwise change the axis of rotation of the cutting tool 12. The centering members 22 are mounted substantially along the entire length of the sheath 21 between the engine 11 and cutting tool 12 so that the drive cable 19 is supported throughout its entire length. The uniform support maintains concentricity of the drive cable within the frame tube, even under extreme conditions of high speed rotation of the drive cable. The spacing between adjacent centering members 22 is typically in the range of 8 to 10 inches apart, however, they may be spaced closer together in the area of a curve to insure proper centering. The centering members 22 generally fit freely within the frame tube 18 except for the centering member 22 closest to one of the two ends of the frame tube 18, which is formed slightly larger so that it must be compressed to fit within the frame tube and thereby prevent rotation relative to the frame tube.

It is believed that the centering of the drive cable 19 through the use of the spiral wound centering members 22 also decreases vibrations, friction and resulting heat as compared with the longitudinal fins of the prior art. This reduction in produced vibration, friction and heat increases the useful life of the drive cable. The spiral spring also absorbs shock loads placed upon the equipment, thereby increasing shaft life.

With reference next to FIGS. 3 and 4, there is a shown a coaxial drive cable centering device or support member 30 in another preferred form of the invention. Here, the support member 31 includes an elongated, flexible, central tube or sheath 32 and a plurality of flexible rubber bushings or centering members 33. Each centering member 33 has a central tube 34 and a plurality of spaced annular rings or flanges 35 coaxially aligned longitudinally along and extending from the central tube 34. Here, each annular flange 35 may be considered an annular contacting element. The number, thickness, and spacing of the flanges 35 may vary.

In use, the coaxial cable centering device 30 is mounted within the frame tube 18 (as previously shown) so that the centering members 33 provide a concentric relationship between the sheath 32 and the frame tube 18. This is especially important when, as shown in FIG. 1, the frame tube 18 is curved in order to direct or otherwise change the axis of rotation of the cutting tool 12. The centering members 33 are mounted substantially along the entire length of the sheath 32 between the engine 11 and cutting tool 12, so that the drive cable 19 is supported throughout its entire length. The uniform support maintains concentricity of the drive cable within the frame tube and sheath, even under extreme conditions of high speed rotation of the drive cable.

It is believed that the centering of the drive cable 19 through the use of the annular flanges also decreases vibrations, friction and resulting heat as compared with the longitudinal fins of the prior art. This reduction in produced vibration, friction and heat increases the useful life of the drive cable.

It should be understood that with both of the preferred embodiments a set screw or the like is not required to prevent rotation of the centering device relative to the frame tube, a requirement associated with the prior art devices.

It thus is seen that a drive cable centering device is now provided that provides a superior centering of drive cable within a frame tube. It should be understood that many modifications may be made to the specific preferred embodiment described herein, in addition to those specifically recited, without departure from the spirit and scope of the invention as described by the following claims.

The invention claimed is:

1. In combination with a working implement having a power head, a working head and a shaft assembly which extends between said power head and said working head which includes a frame tube, a. drive cable, and a coaxial drive cable centering device, said drive, cable centering device comprising, a flexible central sheath, and a plurality of centering members, each centering member having a plurality of annular contacting elements positioned between said sheath and said frame tube, and wherein at least one said centering member is a helical coil having opposite ends and a central portion, and wherein said opposite ends have a diameter smaller than the diameter of said middle portion.

2. The drive cable centering device as set forth in claim 1 wherein each said centering member is a helical coil.

3. A drive cable centering device comprising, a flexible central sheath, and a plurality of centering members, each centering member having a plurality of annular contacting elements positioned concentrically about said sheath, wherein at least one said centering member is a helical coil having opposite ends and a central portion, and wherein said opposite ends have a diameter smaller than the diameter of said middle portion.

4. The drive cable centering device as set forth in claim 3 wherein each said centering members is a helical coil.

5. A drive cable centering device comprising, an elongated central sheath, and a plurality or flexible centering members aligned longitudinally along and coupled to said central sheath, each said flexible centering member having a plurality of longitudinally aligned annular contacting elements positioned about said sheath, wherein at least one said centering member is a helical coil having opposite ends and a central portion, and wherein said opposite ends have a diameter smaller than the diameter of said middle portion.

6. The drive cable centering device as set forth in claim 5 wherein each said centering members is a helical coil.

* * * * *